United States Patent [19]
Siann

[11] Patent Number: 5,229,855
[45] Date of Patent: Jul. 20, 1993

[54] SYSTEM AND METHOD FOR COMBINING MULTIPLE COMPOSITE VIDEO SIGNALS

[75] Inventor: Jonathan I. Siann, Hedge End, England

[73] Assignee: International Business Machines Corporation, Armonk, N.Y.

[21] Appl. No.: 781,785

[22] Filed: Oct. 23, 1991

[30] Foreign Application Priority Data

Jul. 18, 1991 [GB] United Kingdom ............... 91306556

[51] Int. Cl.[5] ...................... H04N 5/262; H04N 5/268
[52] U.S. Cl. .................................... 358/183; 358/181; 358/22
[58] Field of Search ..................... 358/183, 22 PP, 181

[56] References Cited

U.S. PATENT DOCUMENTS

| | | | |
|---|---|---|---|
| 4,862,269 | 8/1989 | Sonoda et al. | 358/183 |
| 4,914,509 | 4/1990 | Idei | 358/183 |
| 5,065,243 | 11/1991 | Katapiri | 358/183 |

Primary Examiner—John K. Peng
Attorney, Agent, or Firm—Jack M. Arnold

[57] ABSTRACT

A video merging system includes apparatus for decoding incoming composite video signals into their constituent components, a memory for storing a signals temporarily to synchronize such signals with an output device, and a multiplexor for combining the synchronized signals for application to the output device. An analogue to digital converter (ADC) is arranged to convert incoming composite video signals into digital form, a digital memory is arranged to receive the digital output of the ADC, and a decoder is provided to sample the contents of this memory under the control of timing signals synchronized with the output device to develop synchronized digital samples relating to the incoming composite video signals. These digital samples are then transferred to the multiplexor to enable the multiplexor to develop a single output data stream. This system requires less memory space than needed by prior art systems and enables high quality color representations such as 24 bit RGB to be developed without increasing the memory requirement of the system.

2 Claims, 2 Drawing Sheets

SYSTEM AND METHOD FOR COMBINING MULTIPLE COMPOSITE VIDEO SIGNALS

FIELD OF THE INVENTION

The present invention relates to a system and method for combining multiple composite video signals into a single output data stream synchronized with an output device. In general these video signals will be independent from each other and from the output device, for example differing in terms of line rate, frame rate, and sequential or interlaced operation.

BACKGROUND OF THE INVENTION

Systems that merge video signals and/or graphics are conventionally very memory intensive. In order to combine video signals into a single output data stream synchronized with an output device, such systems implement the following functions:

(1) Demodulate incoming composite video signals into their constituent components;

(2) Synchronize the demodulated signals with the output device via a memory element;

(3) Merge or multiplex the synchronized signals together to form an output data stream which is sent to the output device.

In most applications there will be a master signal that is already synchronized with the output device. In the case of a television receiver the master signal would be the main 'picture'. In the case of a computer type display the master signal might be the data stream from the graphics layer.

In the article 'IC Set for a Picture-in-Picture System with On-Chip Memory', IEEE Transactions on Consumer Electronics, Vol 36, No. 1, (Feb 1990), pp 23-31, Mr Burkert et al discuss a picture-in-picture system consisting of two devices, namely an "Analog Digital Converter Interface for the Inserted Picture" (ADIIP) and a "Picture Insertion Processor" (PIP). The ADIIP adjusts an analog video channel for the inserted picture to the digital inputs of the PIP and requires the following four analog input signals from a standard color decoder:

Y—A Luminance signal;
U,V—The Chrominance signals; and
Sand—A pulse used as a horizontal timing reference.

A digital data stream is produced by the ADIIP and sent to the PIP, where it is passed through decimation filters, the resultant data being stored in an internal memory. This data is read out of the memory at a rate that is synchronized with the external line frequency of the master (parent) channel, and is output from the PIP as analog output signals having the component signals Y, -(B-Y), -(R-Y). Alternatively the data from the memory can firstly be converted into RGB signals which are then converted to analog and output from the PIP.

The article 'Development of a Digital TV system for use in Computer Systems', by K Kohiyama et al, IEEE Transactions on Consumer Electronics, Vol. 35, No.3, (Aug 1989), pp 624-629, describes a system for merging and integrating computer and TV images. In this system a non-standard digital TV signal is divided into a color signal and an intensity signal by a Y/C separator circuit. These non-standard signals are then converted into standard TV signals in an AFC circuit which detects the phase difference between the color burst signal and the horizontal sync signal in the non-standard signal and then performs a linear interpolation operation on this signal according to the detected phase difference to produce a standard TV signal. The standard TV signals are then adapted for storage, converted to RGB signals and stored in a digital memory. These RGB signals can then be read from memory at any desired rate. For example they can be read out at a computer scan rate, converted back to analog signals, and then superimposed on a computer generated image.

The article 'Picture in Picture System with Digital Memory for VCRS', by M Masuda et al, IEEE Transactions on Consumer Electronics, Vol. CE33, No. 3, (Aug 1987), pp 230-239, discloses a Picture-in-Picture system for VCRs that uses a dual port memory. A VCR has two inputs, namely a signal from the tuner and a playback signal. The system allows both signals to be viewed simultaneously, one signal forming the main picture and the other signal forming a superimposed sub-picture. The system performs processing steps on the component signals of the sub-picture, time compresses the sub-picture, and combines the main picture with the sub-picture for display on a single TV screen. In this process the input sub-picture is separated into a luminance signal and a color difference signal and these analog signals are then converted to 6-bit digital signals before being stored in the dual port memory. These signals are then read out at a different rate, converted back into analog signals, and combined with the main signal for display.

European patent application EP 0,288,152 describes a video signal generator for generating a signal representing both a main picture and an auxiliary picture simultaneously. An auxiliary video signal demodulated into chrominance and luminance values is sampled and samples from every third line of the auxiliary video signal are stored in a self-sequencing memory as part of a compressed auxiliary signal. A sync separator also receives the auxiliary video signal in order to generate a clocking signal to determine when the sampled signal is written into memory, whilst a write address generator creates write address information to determine where the sampled signal is written to within the memory. The compressed auxiliary signal information is then read from memory at a rate and from memory locations determined by the demodulated main video signal so as to be synchronous with the main video signal. This compressed signal information is then substituted for appropriate main signal sample information to create combined samples which are sent to a 'Pix-in-Pix' video signal processor.

All of the above mentioned systems require a large amount of memory space in order to store the component signal data of the demodulated video signal. This memory space has been reduced in these prior art systems to some extent by performing various packing functions on the video data before it is stored in memory. However such packing processes are undesirable since they cause degradation in the signal to noise ratio (SNR) and aliasing artefacts to be introduced. Generally the greater the packing, the greater the degradation of the signal, but the smaller the amount of memory required. Hence a compromise is necessary to achieve an acceptable result. A typical packing standard which is regarded as acceptable for consumer use is CCIR 601.

DISCLOSURE OF THE INVENTION

It is an object of the present invention to provide a system and method for combining multiple composite video signals into a single output data stream synchronous with an output device which requires less memory space than needed by the systems of the prior art, and which will enable the video signals to be processed without the quality needing to be compromised to the extent demanded hitherto.

Accordingly, the present invention provides a system for combining multiple composite video signals into a single output data stream synchronized with an output device, including means for decoding incoming composite video signals into constituent components, memory means for storing signals temporarily to synchronize such signals with said output device, and a multiplexor for combining the synchronized signals for application to said output device, characterized by: an analogue to digital converter (ADC) arranged to convert incoming composite video signals into digital form; a digital memory arranged to receive the digital output of said ADC; and a decoder arranged to sample the contents of said memory under the control of timing signals synchronized with said output device to develop synchronized digital samples relating to said incoming composite video signals and to transfer the digital samples to said multiplexor to enable said multiplexor to develop said single output data stream.

This system digitizes the composite video signals and then stores them as raw composite signals in digital form. Since no demodulation of the signals occurs prior to storage less memory space is required to store the signals than is necessary with the prior art systems. This raw digital data is then read out under the control of timing signals synchronized with the output device and demodulated into its constituent components. However unlike the prior art these composite signals need not be decimated in any way since the memory saving has already been achieved. Instead they can be converted into any color space representation which is convenient for the application, eg. CCIR 601 or 24 bit RGB. Hence it is possible to select a high quality representation such as 24 bit RGB without increasing the memory requirement of the system, unlike with prior art systems where the representation chosen had a direct bearing on the amount of memory storage required.

The system of the present invention can store the output data from the ADC in the digital memory in a variety of different formats. However in preferred embodiments the digital output of said ADC corresponds to a first composite video signal, the digital memory comprises a plurality of memory locations, and the system further comprises a first sync signal associated with the first composite video signal and a clock responsive to the first sync signal to generate a first clocking signal, the digital memory being arranged to receive the digital output of the ADC at the memory locations determined by the first sync signal and at a rate determined by the first clocking signal.

The system of the present invention can be used to combine multiple composite video signals which are all independent from each other and from the output device, or alternatively can combine composite video signals with one or more master signals which are synchronized with the output device. In preferred embodiments the first composite video signal is to be combined by the multiplexor with a master video signal that is synchronous with said output device, that master video signal having a corresponding second sync signal and second clocking signal. In this embodiment the decoder samples the content of the digital memory from memory locations determined by said second sync signal and receives the second clocking signal as the timing signal.

The system of the present invention can operate with incoming composite video signals which are either monochrome or contain color information. In the preferred embodiment the composite video signals contain color information and said decoder comprises: a luma decoder to perform amplitude demodulation on the sampled contents of said digital memory so as to generate corresponding intensity values; a chroma decoder to extract chroma phase data from the sampled contents of said digital memory and to use the chroma phase data in combination with the sampled contents of the memory to develop color values, said chroma decoder operating at a pace determined by said timing signals but extracting said chroma phase data with respect to the color information; and a merging device for merging the intensity values and color values in such a way as to develop the digital samples in a particular desired color space representation.

The output device employed in the present invention could be one of a variety of output devices, for example a monitor, a printer or a cable TV network. In the preferred embodiment the output device is a monitor.

The present invention also provides a method of combining multiple composite video signals into a single output data, stream synchronized with an output device, which includes the steps of decoding incoming composite video signals into constituent components, storing signals temporarily to synchronize such signals with said output device, and combining the synchronized signals for application to said output device, and is characterized by the steps of: converting incoming composite video signals into digital form; storing said digital form in a digital memory; sampling the contents of said digital memory under the control of timing signals synchronized with said output device and developing said contents so as to form synchronized digital samples relating to said incoming composite video signals; and combining the digital samples in order to develop said single output data stream.

The present invention will be useful in many technical areas involving the display of images, for example in the area of semiconductor video display devices where the present invention would be a good integration option for ICs. Typical examples of applications that could employ the system and method of the present invention include:

Multimedia Workstations
Video Conferencing Devices (Analogue Frequency Domain Multiplex Transmission)
'Picture in Picture' Television Receivers
'Picture in Picture' Video Tape Recorders
General Composite Video Capture Devices

BRIEF DESCRIPTION OF THE DRAWINGS

The present invention will be described further, by way of example only, with reference to an embodiment thereof as illustrated in the accompanying drawings in which:

FIG. 1 shows a conventional system for merging a composite video signal with a master video stream. Such systems essentially consist of a modified television decoder with an added memory buffer. The buffer is used to store line locked digitized chroma/luma data. This data is read from the buffer at a rate synchronized with the master video stream. All commercially available PIP TV/Computer systems operate in this manner. FIG. 1 will now be discussed in more detail.

BEST MODE OF CARRYING OUT THE INVENTION

Figure 1:
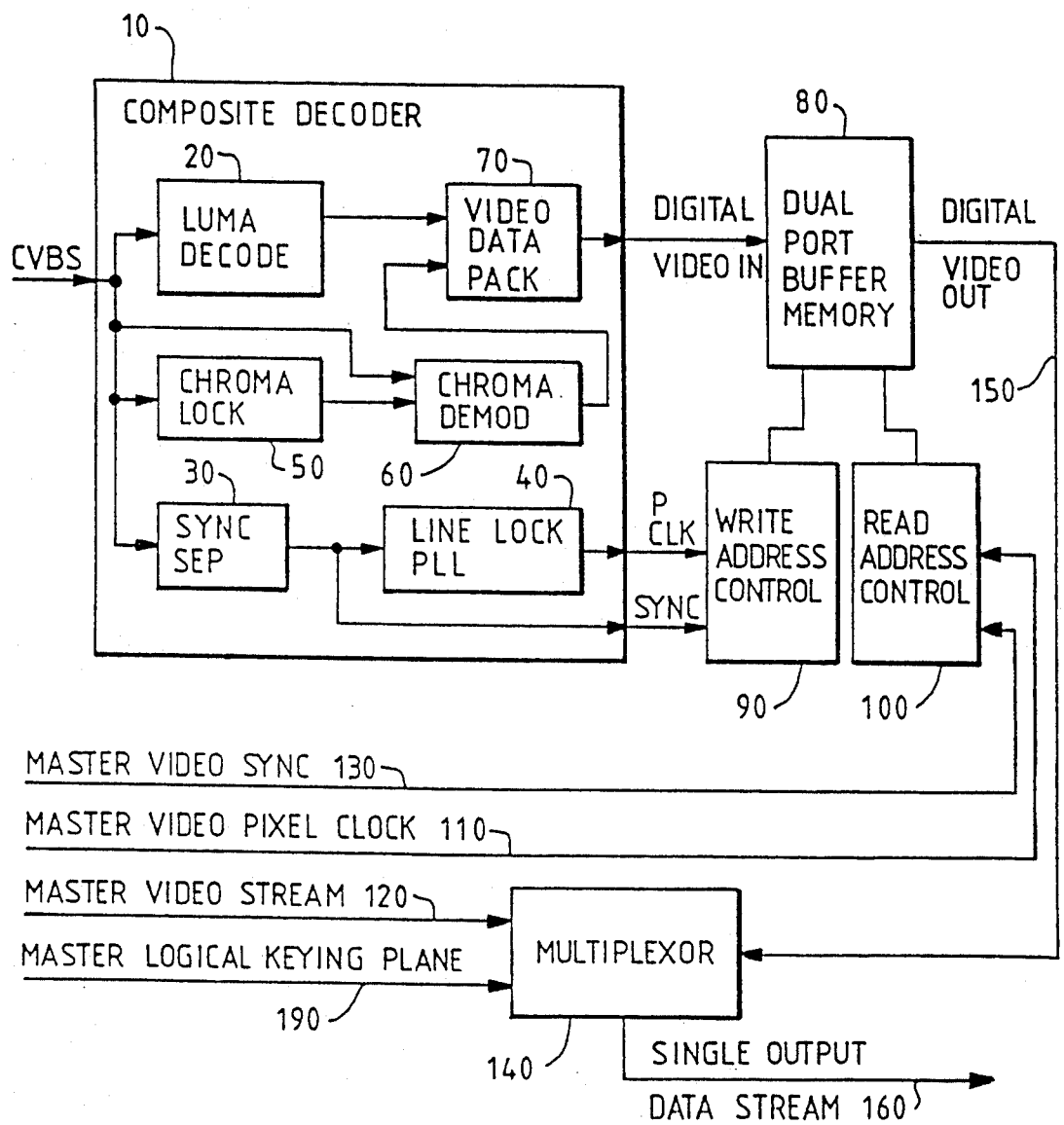
FIG. 1 is a block diagram showing the arrangement of a typical prior art system.

An incoming composite video baseband signal (CVBS) is fed into a composite decoder block 10 where it is demodulated into its component luma signal Y and chrominance signals U, V. The luma signal is extracted by a standard luma decode block 20 which performs amplitude demodulation detection on the incoming CVBS. The sync signal is stripped from the incoming CVBS by a sync separator 30 and is input to a line locked phase locked loop (Line Locked PLL) circuit 40 where it is used to generate a pixel clock (PClk) synchronized with the incoming CVBS. A Chroma Lock circuit 50, gated by the Sync Separator 30, extracts the color burst reference phase from the CVBS. The color burst reference phase signal thus generated is then used in conjunction with the CVBS by a standard Chroma Demod circuit 60 to generate chrominance values.

Note that the above described composite decoder block 10 usually operates with analogue signals and digitizes such signals after chroma and luma information has been extracted. However this is not necessary and some systems employ a decoder block in which all the processing is performed digitally. In these systems the incoming CVBS will pass through an analogue to digital converter (ADC) before entering the composite decoder block 10. However the data flow within the decoding block is exactly the same, irrespectively of whether analogue or digital processing techniques are being used; such an example of a digital decoder block is given in the article 'Digital Signal Processing for Memory Features in TV Applications' by E Pech, IEEE Transactions on Consumer Electronics, Vol CE-32 (1986) No.4, pp 754-758.

The chrominance and luminance information obtained from the chroma demod circuit 60 and the luma decode block 20 respectively, and hereinafter referred to as the color space data, is next transferred to a video data packing stage 70 where it is packed into a convenient form for efficient memory storage. In PIP TV systems the color space data would be decimated (subsampled) to lower the size of memory required. Another technique which can be applied to reduce the memory requirement involves using coarser quantization on the data sample (eg 6 bits rather than 8 bits). The data packing stage 70 may also optionally include a color space convertor block placed before the packing circuitry for converting the chrominance and luminance signals into RGB values.

As has been mentioned earlier these packing methods are undesirable since they compromise the video quality. Generally degradation in signal to noise ratio (SNR) and aliasing artefacts will be introduced by the packing process. However packing in such prior art systems is necessary in order to reduce the need for expensive memory space.

After packing has been performed the resultant color space data is written into a dual port buffer memory 80 containing a plurality of memory locations at a rate fixed by the line locked PPL clock (PClk). The sync information (odd/even, hsync, vsync) of the incoming CVBS obtained by the sync separator 30 is used to determine which memory locations the data is written to. The writing of the packed color space data into the buffer memory is performed under the control of a Write Address Control block 90; such a control block is well known in the art and hence its operation will be readily apparent to one skilled in the art.

The contents of the buffer memory corresponding to the color space data are read out under the control of the Read Address Control block 100 at a rate fixed by the master video pixel clock 110 of the master video stream 120. The Read Address Control Block 100 reads the contents from the memory locations determined by the master video sync 130.

Note that in computer applications an extra read/write data path would be available from the Dual Port Buffer Memory 80. This enables general purpose image data processing access to the stored video information, for example to allow the stored information to be transferred to hard disk.

The contents of the buffer memory read out by the Read Address Control block are passed via a connector 150 to a multiplexor 140. The multiplexor 140 selects either this scan rate converted/synchronized Digital Video signal from the connector 150 or the master Video Stream, thus creating a single output data stream 160 which is transmitted to the display stages of an output device such as a monitor. A master logical keying plane signal 190 is input to the multiplexor 140; this is a gating signal which determines where the composite video source is to be positioned, or 'windowed', within the master video source, and so controls which signal is selected by the multiplexor.

The preferred embodiment of the present invention will now be described with reference to FIG. 2. The system of the preferred embodiment is used to combine an independent composite video signal with a master video stream which is synchronized with the output device. This preferred embodiment retains the processing blocks used in prior art systems, but by altering the distribution of the processing and its clocking structure the memory storage requirement is reduced and signals are able to be processed without the degradation caused by packing.

Figure 2:
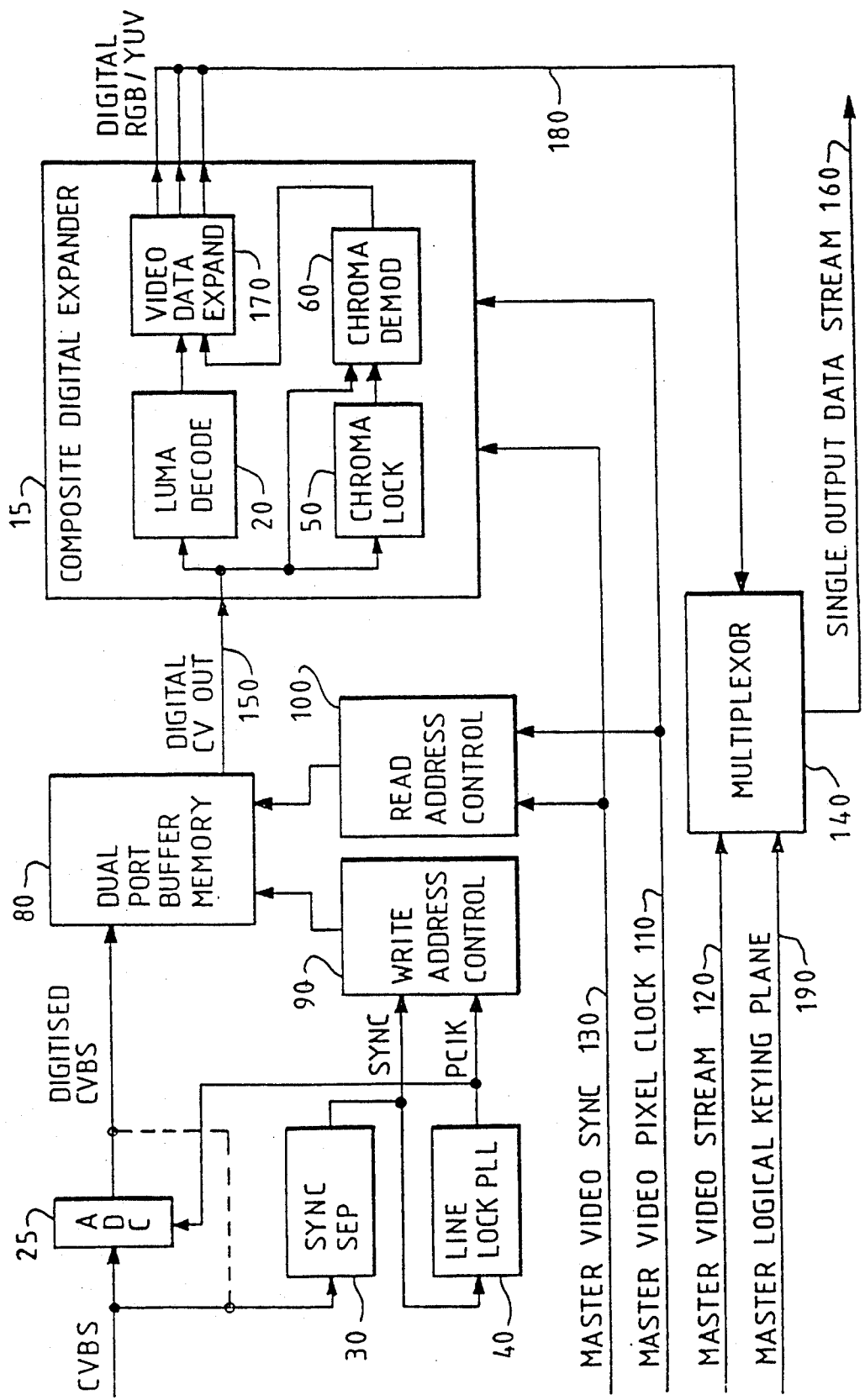
FIG. 2 shows the arrangement of the system according to a preferred embodiment of the present invention.

As is apparent from FIG. 2 the dual port buffer memory 80 has been positioned between a pixel clock generation circuitry and a composite digital expander block 15. With this arrangement the buffer memory 80 stores raw line locked composite video in digital form.

In detail, the preferred embodiment shown in FIG. 2 operates as follows.

An incoming composite video baseband signal (CVBS) is firstly fed into an analogue to digital converter (ADC) 25 where the CVBS is digitized. The characteristics of the ADC 25 will depend on the application, but for most consumer applications a six bit sample representing a signal by 64 will be adequate. This can be illustrated to be adequate from the following calculations, in which it is assumed that the video signal to noise is defined as peak-to-peak signal/RMS noise, and that a step size of 1 is used.

Assuming a fairly large signal so the quantization noise is random, the quantization noise (x) will be uniformly distributed between $+\frac{1}{2}$ and $-\frac{1}{2}$. Therefore the noise is never greater than $\frac{1}{2}$.

Now the $$RMS \text{ noise} = \sqrt{\int_{-\frac{1}{2}}^{\frac{1}{2}} x^2 \, dx} = \frac{1}{2\sqrt{3}}$$

Therefore the signal to noise for our 6 bit video system is given by:

$$\text{Signal to Noise} = \frac{20 \log_{10} 64}{\frac{1}{2\sqrt{3}}} = 20 \log_{10} 64 * 2\sqrt{3} = 46.92 \text{ dB}$$

The 6 bit sample is therefore a couple of decibels above most consumer video sources and thus contributes less than 2 dB to the noise. Considerable perceived picture quality improvement can be achieved using dithering on the 6 bit decoded data.

Returning to FIG. 2, the incoming CVBS is also fed to a sync separator 30 where the Sync signal is stripped from the CVBS. This sync separator 30 may be an analogue device, in which case the CVBS signal is fed into the sync separator via the connection shown by a solid line in FIG. 2. Alternatively it could be a digital sync separator, in which case the digitized CVBS signal would be fed to it via the connection shown by the dotted line in FIG. 2.

The Sync signal is then passed to a Line Lock PLL block 40 where it is used to generate a pixel clock (PClk) synchronized with the incoming CVBS. This pixel clock is used to drive both the ADC and the Write Address Control block 90. The ADC 25, sync separator 30 and line lock PLL block 40 are standard circuits known in the art and will hereinafter be referred to collectively as pixel clock generation circuitry.

The output from the ADC, which is raw digitized composite video data, is then written into the dual port buffer memory 80 under the control of the write address control block 90. This block 90 writes the output of the ADC into the buffer memory 80 at a rate fixed by the pixel clock (PClk), and into memory locations within said buffer memory 80 as determined by the sync signal (odd/even, hsync, vsync) obtained from the sync separator 30. As mentioned earlier such write address control blocks are well known in the art and so the specific workings of this block need not be discussed.

The Read Address Control Block 100 samples the contents of the buffer memory 80 dependent on signals received representing the master video sync 130 and the master video pixel clock 110. As with the prior art system already discussed, the locations from which the contents of the buffer memory are sampled are determined by the master video sync signal 130 and the rate of sampling of the contents is determined by the master video pixel clock 110.

As in the prior art an extra read/write data path would be available from the Dual Port Buffer Memory 80 in computer applications to allow general purpose image data processing access to the information stored therein.

The sampled contents of the buffer memory 80 are passed to the composite digital expander block 15 for demodulation into their constituent signals. The Luma Decode circuit 20 performs a straight forward amplitude demodulation (AM) detection on the sampled contents in order to create intensity signals from the video data.

The Chroma Lock circuit 50 operates on the digital sampled contents of the buffer memory 80 so as to extract the color burst reference phase. This can be achieved using several methods of phase extraction known in the art which employ digital signal processing where the digitized signal exhibits a well controlled frequency characteristic, as is the case for video subcarrier signals. In the preferred embodiment the phase extraction is performed by logic which incorporates a discrete time oscillator system (DTO) which is clocked by the Master Video Sync/Clock. However, although the DTO operates at a pace determined by the Master Video Stream it extracts the chroma phase with respect to the line locked digital CV. Unlike in prior art systems where the chroma phase extraction processing occurred concurrently with the line locked pixel clock generation, the chroma phase extraction processing is now separated from the line locking process by the buffer memory 80.

The Chroma Demod circuit 60 is a standard chroma mixing stage in which the color burst reference phase signals from the chroma lock circuit 50 are used in combination with the corresponding sampled contents of the buffer memory to generate chrominance values.

The Video Data Expand circuit 170 receives the chroma data from the chroma demod circuit 60 and merges it with the luma data from the luma decode block 20. However, unlike the video data packing stage 70 of the prior art systems it does not need to decimate the signal in any way since the memory saving which necessitated such decimation has already been achieved. Indeed the Video Data expand circuit 170 can convert the video data into any color space representation which is convenient for the application, for example CCIR 601 or 24 bit RGB. With this arrangement it is possible to select a high quality representation such as 24 bit RGB without increasing the memory requirement of the system. If RGB signals are to be developed by the Video Data expand circuit 170 the circuitry will include a standard color space convertor block to convert the chroma/luma signals into RGB signals.

The synchronized digital samples developed by the Video Data Expand circuit 170 are sent via connector 180 to the multiplexor 140. This multiplexor is identical to the one of the discussed prior art system and selects either the digital samples from the video data expand circuit 170 or the master video stream 120, thus creating a single output data stream 160. As in the prior art a master logical keying plane signal 190 is used to provide information concerning the positioning of the composite video source within the master video source and so determine which signal is chosen by the multiplexor 140 at any particular time. The single output data stream is then transmitted by the multiplexor 140 to the display stages of an output device such as a monitor.

Some of the advantages of the above described preferred embodiment of the present invention will now be discussed.

The preferred embodiment significantly reduces the memory required to achieve the same quality performance as prior art. Using the CCIR 601 standard as a guide the preferred embodiment achieves the same quality performance as prior art but with a significant saving in memory. Conservative assumptions to calculate memory size for a prior art system would be:

CCIR format is 4:2:2 YUV.
Sample rate is 13.5 MHz.

Minimum acceptable active line period is 52 μs (this value was obtained from 'Video Techniques' by G. White, 2nd Edition, Heinemann Newnes, (1988) pp 22. for PAL/SECAM coding).

There is no vertical decimation.

8 bit color component quantization is used.

480 lines must be stored.

With a CCIR format of 4:2:2 YUV each pixel is assigned a Y value and either a U or a V value, but not both. These values are alternated so that a pixel with a U value assigned has two adjacent pixels with V values assigned and vice versa. Each Y, U, and V value occupies 1 byte of information and so each pixel therefore has a sample size of 2 bytes, or 16 bits. Since in prior art systems demodulation occurs before storage the sample size for a single pixel would be 16 bits, and hence the size of the frame buffer memory would be $480*16*52*10^{-6}*13.5*10^6$) bits, which is equal to 5391360 bits or 673920 bytes.

Conservative assumptions to calculate memory size for the system of the preferred embodiment would be:

CCIR format is 4:2:2 YUV

Sample rate is 13.5 MHz. (but need only be 10 MHz since there is no significant energy in CV frequency spectrum beyond 5 MHz).

Maximum line period (including color burst) is 64 μs (this value was obtained from 'Video Techniques' by G White, 2nd Edition, Heinemann Newnes, (1988) pp 22. for PAL/SECAM coding).

There is no vertical decimation 8 bit color component quantization is used.

480 lines need to be stored.

Again a CCIR format of 4:2:2 is typical, but since the signal is not demodulated until after it has been stored the sample size for a single pixel would be 8 bits, and therefore the size of the frame buffer memory would be $(480*8*64*10^{-6}*13.5*10^6)$ bits, which is equal to 3317760 bits or 414720 bytes.

If a 10 MHz clock was used instead of the 13.5 MHz one, and suitable anti-aliasing filtering was employed, the buffer memory size could be reduced to 307200 bytes. Also, with suitable color burst gating and quantization, a buffer size of 249600 would be possible.

Hence the memory requirement of the preferred embodiment in order to achieve similar quality performance to that of prior art systems is only 37% to 61% of the memory requirement of such prior art systems.

Another advantage of the preferred embodiment of the present invention is that it significantly reduces the circuitry that is required to allow multiple composite video channels to be windowed. Prior art systems which provide simultaneous monitoring of multiple CV inputs (ie. viewing three or more channels on the same screen) operate as follows.

If real time performance is to be achieved, that is to say no incoming frames are to be lost, each extra channel requires a complete PIP subsystem. It is only the final multiplexor block 140 which is common between channels Therefore considerable cost is incurred for each additional channel capacity.

However the preferred embodiment of the present invention can achieve real time performance at a much reduced cost since only the line locked buffer memories 80 need be reproduced for each extra channel. The composite digital expander 15 can be shared between channels since the Digital CV out from the multiple channels need only be 'viewed' by the expander at the scan rate determined by the master channel. Thus the single expander block 15 can serve multiple channels.

The preferred embodiment of the present invention also facilitates certain picture improvement processing techniques. Composite video systems (NTSC/PAL) suffer from several fidelity defects. Some are intrinsic in the definition of the standard, whilst others are due to the transmitted links.

In this connection, the bandwidth reductions introduced by the CV modulation system necessitate the use of a number of expedients. For example, in order to reduce the bandwidth requirement for CV, the chroma and luma are modulated onto carriers which are close together (approx 3.5 MHz). This leads to chroma/luma interference which manifests as 'crawling dots'.

Several Digital Signal Processing techniques exist to alleviate these artefacts and rely on intrafield processing of the Digitized CV. Two such processing techniques are "Y/C adaptive separation" and "Cross color adaptive separation". Y/C adaptive separation is discussed in the article 'Three-Dimensional Pre and Post-Filtering for PAL TV Signals', by D. Teichner et al, IEEE Transactions on Consumer Electronics, Vol 34 (Feb 1988), No.1, pp 205-227, and also in the article 'Improvement of Picture Quality for NTSC and PAL Systems by Digital Signal Processing', by Y Nakajima et al, IEEE Transactions on Consumer Electronics, Vol CE-31 (Nov 1985), No.4, pp 642-654. Cross color adaptive separation is discussed in the article 'Adaptive Filter Techniques for separation of Luminance and Chrominance in PAL TV signals', by D Teichner, IEEE Transactions on Consumer Electronics, Vol CE-32 (Aug 1986) No.3, pp 241-250.

In both of these techniques the raw data stream which is processed is invariably digital CV. Hence their implementation within the proposed architecture would be very memory efficient.

I claim:

1. A system for combining multiple composite video signals into a single output data stream synchronized with an output device, comprising;

an analogue to digital converter (ADC) arranged to convert incoming composite video signals into digital form as a first composite video signal containing color information;

a first sync signal associated with said first composite video signal and a clock responsive to said first sync signal to generate a first clocking signal;

a digital memory including a plurality of memory locations arranged to receive the digital output of said ADC at the memory locations determined by said first sync signal and at a rate determined by said first clocking signal;

a master video signal that is synchronous with said output device, said master video signal having a corresponding second sync signal and second clocking signal;

a decoder arranged to sample the contents of said memory at memory locations determined by said second sync signal, under the control of said second clocking signal to develop synchronized digital samples relating to said incoming composite video signals, and wherein said decoder includes:

a luma decoder to perform amplitude demodulation on the sampled contents of said digital memory so as to generate corresponding intensity values;

a chroma decoder to extract chroma phase data from the sampled contents of said digital memory and to use said chroma phase data in combination with said sampled contents of said memory to develop color values, said chroma decoder operating at a pace determined by said second clocking signal and extracting said chroma phase data with respect to said color information;

a merging device for merging the intensity values and color values in such a way as to develop the digital samples in a particular desired color space representation; and a multiplexor for combining said first composite video signal with said master video signal to form said single output data stream for application to said output device.

2. A system as claimed in claim 1 wherein said output device is a monitor.

* * * * *